Oct. 22, 1968   B. I. CARLSTRÖM ET AL   3,406,724

PLASTIC TUBES

Filed Nov. 1, 1965

INVENTORS
Börge Ingmar Carlström
Ago Saarnak
Bengt Åke Lennart Ekedahl
BY Pierce, Scheffler & Parker
ATTORNEYS

United States Patent Office 3,406,724
Patented Oct. 22, 1968

3,406,724
PLASTIC TUBES
Börge Ingmar Carlström, Nitorp, Hoganas, Ago Saarnak, Vastra Frolunda, and Bengt Åke Lennart Ekedahl, Hoganas, Sweden, assignors to Aktiebolaget Hoganastmetoder, Hoganas, Sweden, a Swedish company
Filed Nov. 1, 1965, Ser. No. 505,878
Claims priority, application Sweden, Nov. 6, 1964, 13,448/64
2 Claims. (Cl. 138—137)

ABSTRACT OF THE DISCLOSURE

A relatively flexible sewer pipe, capable of being buried deeply into the ground, consists essentially of three concentric layers. The innermost and outermost layers are formed from polyester resin or other thermosetting plastic reinforced with fibrous material. The intermediate layer having high compressive strength is formed from thermosetting plastic material and particulate relatively high density filler, preferably sand and quartz powder. The intermediate layer has a thickness of from about 50 to about 80% of the total thickness of the wall of the pipe.

---

Figure 1:
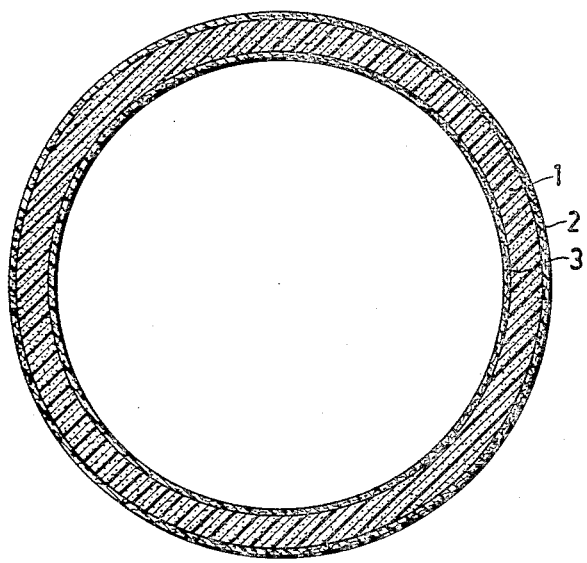

The present invention relates to tubes manufactured of a resin (a plastic) and especially to such tubes which are used in the ground for the draining of sewage water of low pressure, viz. up to 1 kg./cm.$^2$ The invention relates especially to such tubing of plastic material which resist high earth loads without being detrimentally deformed.

Tubes used in the ground can be divided into two main groups, viz. rigid tubes and flexible tubes. This invention relates to the latter group.

For a long time it has not been clear how flexible tubes are influenced by earth loads and, consequently, one has been uncertain regarding how to dimension such tubes. Our recent investigations indicate that a thin elastic tube under high earth load collapses due to cracking or buckling and not due to the bending moment.

It is known to manufacture a tube from a plastic which contains a pulverulent filler. It is also known to manufacture a tube from a plastic which contains fibrous reinforcing particles. The invention is concerned with the problem of manufacturing a tube containing a plastic, a pulverulent filler, and fibrous reinforcing particles, while balancing said components against each other so as to produce a tube having a high resistance against an external pressure, particularly the external pressure acting upon a tube situated in the ground.

The tube of this invention is characterized in that the tube wall comprises one outer and one inner surface zone and between these a central zone, said central zone containing 20–85 percent by volume of a pulverulent filler and said surface zones being reinforced with fibrous material.

The pulverulent filler is much less expensive than the plastic. Consequently, an increase of the content of filler in the central zone of the tube wall is an inexpensive way of increasing the resistance to an external pressure. As a matter of fact, the addition of filler to the central zone makes it possible to manufacture a resinous tube for approximately half the cost of a conventional resinous tube having a fibrous reinforcement throughout its wall thickness.

Of course, the thickness of the tube wall cannot be increased infinitely in the described way. A certain ratio must be maintained between the thickness of the tube wall, the diameter of the tube, and the modulus of elasticity of the material of the wall. If, for instance, the modulus of elasticity is 200,000 kg./cm.$^2$, the ratio of the wall thickness to the tube diameter should not exceed 0.035. If the modulus of elasticity is 100,000 kg./cm.$^2$ said ratio should not exceed 0.040. If the modulus of elasticity is 20,000 kg./cm.$^2$, said ratio should not exceed 0.060. If said ratio exceeds the values given above, the rigidity of the tube will be so high that the tube cannot be considered flexible. This means that the load of the earth would produce a bending moment in the tube.

It is desired that the tube shall be able to resist not only a high load from an external pressure, but also a comparatively high bending moment.

This is achieved, according to the invention, by making the thicknesses of the central zone and the surface zones of the tube wall in a pre-determined relationship to the elongation after rupture (break elongation) of the materials in the respective zones. The best result is obtained if the ratio of the break elongation of the material in the central zone to that of the material in the surface zones is substantially equal to the ratio of the thickness of the central zone to that of the entire thickness of the tube wall. If, for instance, the central zone has a thickness equal to the total thicknesses of the two surface zones, the material of the central zone should preferably have a break elongation which is half of that of the material in the surface zones.

The amount of filler in the central zone should be at least 20 percent by weight, and may be as high as 85 percent by weight and still result in a good resistance to an external pressure. Preferably, said amount of filler should be 50–60 percent by volume. Suitable fillers are quartz, chalk, kaolin, rock flour, and similar pulverulent inorganic materials.

The reinforcing material in the surface zones shall consist of a fibrous material such as paper, textile fabric, asbestos and glass fibres. We prefer to use glass fibres, preferably a mat or a fabric or chopped roving.

If desired, the surface zones may also contain a pulverulent filler, but the content of such filler should be low, as it is more important to incorporate into said zones a high content of a reinforcing fibrous material.

The plastic of the tube of the invention shall be a thermosetting resin, such as an unsaturated polyester resin, an epoxy resin, a polyurethane resin, and a phenolic resin. A polyester resin is preferably used. The catalysts and accelerators used for hardening or gelatinizing such resins are well known in the art and are not described here.

The thickness of the central zone of the tube wall should be 10–80 percent, preferably 50–70 percent, of the entire thickness of the tube wall.

The tube of this invention may be manufactured by means of a mandrel. A fibrous reinforcing material and a plastic are supplied onto the mandrel to form the inner surface zone of the tube. A pulverulent filler and a plastic are supplied onto said inner surface zone to form the central zone of the tube wall. A fibrous reinforcing material and a plastic are supplied onto said central zone to form the outer surface zone. The plastic of the three zones having been hardened or gelatinized the tube is removed from the mandrel, which defines the inner diameter of the tube.

We prefer, however, to manufacture the tube of this invention in a rotary tubular mould. A fibrous reinforcing material and a plastic are supplied—separate or admixed—to the interior of the rotary mould to form the outer surface zone of the tube. This outer surface zone having been hardened a pulverulent filler and a plastic are supplied—separate or admixed—to the interior of the rotary mould to form the central zone of the tube wall. Finally, the materials of the inner surface zone are supplied to the interior of the rotary mould. The catalysts and accelerators required for the hardening or gelatinization of the plastic may be admixed into the plastic before the plastic is supplied to the rotary mould. If, however, the pulverulent filler is supplied to the central zone separate from the plastic, it may be useful to admix part of the catalyst and accelerator into the pulverulent filler, as will be described with reference to the drawings.

It is possible to use the same plastic for all zones of the tube wall, or to use different plastics for different zones. In the latter case it is important that the different plastics of two adjacent zones adhere firmly to each other. The adherence can be improved if the plastic of one zone is not fully hardened when being brought into contact with the material which is to form the next zone.

Figure 2:
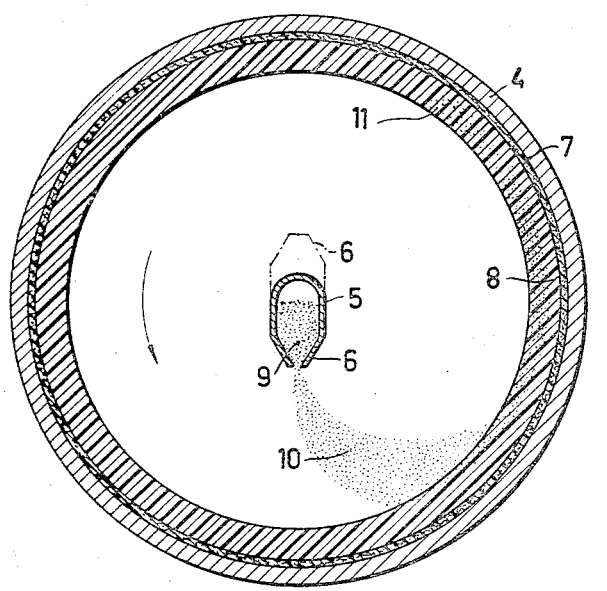

The accompanying drawing illustrates the invention. FIG. 1 shows a cross-section of a tube of the invention. FIG. 2 shows a cross-section of a rotary tubular mould in which a tube of the invention is being manufactured.

The tube of FIG. 1 has a wall containing three zones, namely a comparatively thick central zone 1 consisting of a plastic containing a high percentage of a pulverulent filler, and comparatively thin outer and inner surface zones 2 and 3 consisting of a plastic containing fibrous reinforcing particles.

FIG. 2 illustrates a tube-making apparatus comprising a tubular mould 4 which can be rotated at an appropriate speed in the direction of the arrow by means of a motor which is not illustrated, and a generally U-shaped channel or trough 5 extending along the entire length of the mould. The trough 5 has a comparatively narrow opening 6, and can be rotated so that said opening is either up or down.

When a tube is to be manufactured the trough is filled with a mixture of a pulverulent filler and a hardening catalyst for the plastic to be used for the central zone of the tube wall. A glass fibre mat is placed so as to cover the inside wall of the mould 4. The mould is now brought to rotate, and a liquid plastic containing a hardening catalyst is poured or sprayed into the rotating mould. Because of the centrifugal force the plastic is evenly distributed in the mould and penetrates into the glass fibre mat to fill its pores. The mould still rotating, the plastic is allowed to harden, thus forming the outer surface zone 7 of the tube.

A liquid plastic is now supplied to the mould in a quantity required for the central zone of the tube wall. Said plastic should preferably contain no hardening catalyst, or a minor amount of the catalyst only. Said plastic having been distributed evenly in the mould, and being still in a liquid condition, the trough 5 is turned top-end down. The filler-catalyst mixture 9 falls down (See No. 10) onto the plastic, and the filler particles 11 sink through the liquid plastic, owing to the centrifugal force. Simultaneously, the catalyst begins to work, finally producing a hardened central zone 8. If a slow-acting hardening catalyst is used the entire quantity of catalyst may have been added to the plastic before the plastic is supplied to the mould.

The rotation of the mould is now stopped, a glass fibre mat is placed on the interior wall of the central zone 8, and a liquid plastic is supplied and allowed to harden to form the inner surface zone of the tube wall. The finished tube is finally removed from the mould.

It has been found that the speed of the rotary mould should be limited so that the centrifugal force does not exceed 2.5 times the gravity. A higher speed involves the risk that the plastic and the filler in the central zone will separate from each other, and also the risk of an uneven distribution in the longitudinal direction. A low speed, resulting in a centrifugal force less than 0.5 times the gravity, involves the risk that the resin will drip. A suitable speed should produce a centrifugal force of 1.3–2 times the gravity. The lower value is true for filler-resin compositions having a comparatively low viscosity, and the higher value is true for compositions having a compara- tively high viscosity. In the following examples the ratio of filler to resin is usually 1.2–2.0 parts by weight of filler to 1 part by weight of resin. The filler is preferably quartz powder, 40 percent by weight of the powder having a particle size below 0.074 mm. and 60 percent between 0.125 and 0.5 mm. If a higher percentage of filler is desired, it should preferably be added separate from the resin, as described with reference to FIG. 2. If a ratio by weight of filler to resin of more than 2 is desired, the speed of the rotary mould shall be high, preferably 500–1000 r.p.m. for a mould having a diameter of 500–800 mm. This is the speed usually used in the manufacture of the outer and inner surface zones. When using this high speed the filler cannot flow in the longitudinal direction of the tube, but remains fixed on the spot where it has impinged upon the tube wall. It is therefore important that the filler is evenly distributed inside the rotary mould, for instance by means of the trough illustrated in FIG. 2.

In FIG. 2 of the drawing the mould consists of a separate tube. According to another embodiment of the process the outer surface zone can be used as a rotary mould. A thin-walled tube is made in a conventional way, consisting of plastic reinforced with a fibrous material. This tube is mounted in a machine in which can be rotated at a convenient speed. A central zone, containing a filler, and an inner surface zone containing a fibrous reinforcing material is made inside the pre-fabricated tube with the centrifugal method described with reference to FIG. 2.

Example 1

A tube is made on a mandrel which has a diameter of 800 mm. and which is rotated slowly. A parting agent is first supplied onto the surface of the mandrel, for preventing the resin from sticking to the mandrel. A strip is now wound spirally on the mandrel, said strip consisting of a web or fabric of "roving" having a weight of 600 g./m.$^2$ and having been impregnated with an unsaturated polyester plastic. A mixture of 40% by weight of polyester plastic and 60% by weight of quartz powder is now supplied onto the first layer, to form a central zone having a thickness of about 5 mm. Another layer of "roving" fabric and unsaturated polyester plastic and hardening catalyst is wound onto the central zone. The tube is pulled off the mandrel synchronously with the winding-on operation, and is finally passed through a heating zone in which the plastic is hardened or gelatinized.

Example 2

A tube is manufactured in a rotary, tubular mould having a diameter of 1000 mm. The mould wall is first covered with a parting agent. Chopped glass fibres and a polymerizable hydrocarbon resin, containing a hardening catalyst, are sprayed into the mould to form a layer having a thickness of 1.5 mm. The content of glass fibres is about 40 percent by weight. The mould is rotated at about 730 r.p.m. The plastic having impregnated the glass fibres entirely, and having been hardened, the speed is reduced to about 50 r.p.m. An unsaturated polyester resin is supplied to form a layer having a thickness of 8 mm. The resin contains a hardening catalyst and 70 percent by weight of kaolin. This layer having been hardened, the speed is again increased. Another layer of chopped glass fibres and a polymerizable hydrocarbon resin is produced, having a thickness of 1.5 mm. The hardening is finished by the mould being heated.

Example 3

A slowly rotating mandrel having a diameter of 500 mm. is treated with a parting agent. Continuous glass fibres (roving), impregnated with an epoxy resin are wound upon said mandrel in a crosswise direction to produce the highest strength possible. The glass content is 60 percent by volume. When a layer having a thickenss of 1 mm. has been obtained, a 4 mm. thick central zone is produced by supplying onto the first layer a mixture of polyurethane resin end chalk powder, the latter being present in 60 percent by volume. This layer having hardened, an outer layer is produced in the same way as the inner layer. The hardening is finished by the tube being irradiated by infra-red rays.

Example 4

A glass fibre mat is wound upon a mandrel having a diameter of 800 mm. to form a fibrous layer having a weight of 450 g./m.² The mat is now impregnated with an unsaturated polyester resin. The glass content of this layer is 30 percent by weight. Now a 6 mm. thick central zone is produced by supplying a mixture of 70 percent by weight of portland cement and 30 percent by weight of polyester plastic. This zone having been hardened to a sufficient degree, an outer layer is manufactured, equal to the inner layer. When the hardening is finished the tube is pulled off the mandrel.

Example 5

A glass fibre mat having a weight of 600 g./m.² is placed inside a rotary mould having a diameter of 500 mm. A commercial grade polyester resin is supplied and hardened to form an outer surface layer having a thickness of 1.5 mm. Now a liquid mixture of 70 percent normal polyester resin and 30 percent soft polyester resin is supplied. The resin contains the required hardening catalysts and accelerators. The amount of resin is 2.7 kg./m.². Now a mixture of 60 percent by weight of sand and 40 percent by weight of quartz powder is supplied in a quantity of 5.3 kg./m.². The sand had a particle size of 0.125–0.5 mm., and the quartz powder had a particle size of less than 0.074 mm. The filler-resin layer having hardened, another glass fibre mat is supplied, having a weight of 600 g./m.² and normal polyester resin in a quantity of 1.8 kg./m.². The hardening having been finished, the tube is tested in an "earth load box" in which it is exposed to the load of a 10 m. high earth column consisting of gravel having a particle size between 1 and 10 mm. The stresses in the inner and outer surfaces of the tube were measured with a strain gauge. The highest stress measured was approximately 140 kg./cm.². This corresponds to an elongated in the central zone of not more than 0.08%. The deformation of the tube resulted in an increase in the horizontal diameter of 4%. Consequently, the stress in the material of the tube is very small, in spite of the high earth column, and the tube can be safely exposed to high earth loads. A corresponding test was made with a resinous tube in which the entire tube wall was reinforced with glass fibres. The highest stress measured was approximately 120 kg./m.², and the deformation resulted in an increase in the horizontal diameter of 3.8%. Evidently the invention makes it possible to manufacture a tube having approximately the same strength characteristics as a conventional fibre-resin tube.

In some types of earth, the so-called cohesion earth, the stress will be much higher than that mentioned above. This is due to the fact that the "passive" pressure exerted by such earth upon the tube is not as high as in the above mentioned case. For protecting the central zone from too high tensile forces the central zone should be modified so as to have a suitable break elongation. The break elongation of normal mixtures of a resin and a high amount of filler is comparatively low. It amounts to approximately 0.05%, provided that the resin has not been modified with a soft resin. An addition of 20–30% soft resin increases the break elongation to 0.08–0.1%. A further increase of a soft resin results in a much higher break elongation. A glass fibre reinforced polyester resin has an entirely different break elongation, namely approximately 2%.

In order to obtain an optimal result when the tube is exposed to a high bending moment the elastic properties of the various zones or layers should be weighed against each other so that the central zone does not rupture before the surfaces zones. When thus weighing the properties of the layers the following facts should be taken into consideration.

If the surface zones are reinforced with glass fibres the strength of said zones depends on the fibres and on the adhesion of the resin to the fibres. Moisture, for instance, results in a decrease in strength of the surface zones. The strength of the central zone, too, is reduced by moisture, but to a different degree. A safety factor of 5–10 is usually considered appropriate for glass fibre reinforced articles, whereas the safety factor for filler-resin mixtures is usually 2–3. Consequently, the safety factor for the surface zones should be about 3 times that of the central zone. In order to obtain the best result in the short-time tests described above, the break elongation of the central zone should be proportional to that of the surface zones and to the thickness of the central zone, and inversely proportional to the entire thickness of the tube wall. Long-time tests, however, require a different safety factor, and therefore tubes for practical use should satisfy the equations, if an optimal result is to be obtained:

$$\epsilon_k < \frac{1}{2} \epsilon_y \frac{t_k}{t}$$

$$\epsilon_k < \frac{1}{3} \epsilon_y \frac{t_k}{t}$$

in which $\epsilon_k$ is the break elongation of the central zone,
$\epsilon_y$ is the break elongation of the surface zones,
$t_k$ is the thickness of the central zone,
$t$ is the entire thickness of the tube wall.

We claim:
1. An underground conduit consisting essentially of a flexible tube made from reinforced thermosetting plastic material and consisting of one outer and one inner layer, each consisting essentially of thermosetting plastic material reinforced with fibrous material, and an intermediate layer consisting essentially of 15–80% by volume of thermosetting plastic material and 20–85% by volume of high density pulverulent filler selected from the group consisting of quartz, chalk, kaolin, and rock flour, the thickness of the intermediate layer amounting to from about 50 to about 80% of the total thickness of the tube wall, the flexibility of the conduit being ensured by maintaining the following criteria, to wit, the ratio between wall thickness and tube diameter shall be lower than 0.06; the break elongation of the intermediate layer shall be lower than half of the break elongation of the surface layer multiplied by the ratio of the intermediate layer thickness to the entire thickness of the conduit wall but always higher than 0.05%, and the modulus of elasticity of the conduit wall shall be higher than 20,000 kg./m.²

2. The underground conduit defined in claim 1, in which each of the inner and outer layers consists essentially of polyester resin reinforced with glass fiber and the intermediate layer consists essentially of polyester resin and filler in relative proportions by weight from 1 to 2, said filler consisting essentially of about 60% sand and 40% quartz powder the sand having a particle size of 0.125–0.5 mm. and the quartz powder having a particle size of less than 0.074 mm.

References Cited

UNITED STATES PATENTS

| | | | |
|---|---|---|---|
| 2,305,017 | 12/1942 | Lewis | 138—141 |
| 2,552,599 | 5/1951 | Stout | 138—140 |
| 2,807,282 | 9/1957 | Watts et al. | 138—141 |
| 2,824,033 | 2/1958 | Donaldson | 156—74 |
| 2,857,932 | 10/1958 | Calderwood | 138—141 |
| 2,962,052 | 11/1960 | Sergovic | 138—141 X |
| 2,991,808 | 7/1961 | Siegmann et al. | 138—141 |

LAVERNE D. GEIGER, *Primary Examiner.*

C. L. HOUCK, *Assistant Examiner.*